(12) United States Patent
Muraguchi et al.

(10) Patent No.: US 6,545,435 B2
(45) Date of Patent: Apr. 8, 2003

(54) CATHODE RAY TUBE AND SIGNAL DETECTING METHOD IN CATHODE RAY TUBE

(75) Inventors: Shoichi Muraguchi, Kanagawa (JP); Hiromu Hosokawa, Chiba (JP); Takahiro Inoue, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/947,471

(22) Filed: Sep. 7, 2001

(65) Prior Publication Data

US 2002/0047662 A1 Apr. 25, 2002

(30) Foreign Application Priority Data

Sep. 13, 2000 (JP) ........................................ 2000-278758

(51) Int. Cl.[7] ................................................. G09G 1/04
(52) U.S. Cl. ........................... 315/370; 315/403; 315/9; 315/10; 315/366
(58) Field of Search ............................. 315/9, 10, 13.1, 315/366, 368.15, 382.1, 383, 370, 403; 348/805, 807; 345/11; 313/402, 408, 409, 413, 477 R

(56) References Cited

U.S. PATENT DOCUMENTS

| | | | |
|---|---|---|---|
| 4,792,720 A | 12/1988 | Takenaka et al. | 313/409 |
| 5,418,426 A | 5/1995 | Rilly | 315/9 |
| 5,694,033 A | * 12/1997 | Wei et al. | 323/315 |
| 6,304,034 B1 | * 10/2001 | Hosokawa et al. | 313/2.1 |
| 6,317,114 B1 | * 11/2001 | Abali et al. | 345/672 |

FOREIGN PATENT DOCUMENTS

| | | |
|---|---|---|
| EP | 1 039 762 | 9/2000 |
| EP | 1 054 379 | 11/2000 |
| EP | 1 056 068 | 11/2000 |
| EP | 1 067 575 | 1/2001 |

* cited by examiner

Primary Examiner—Haissa Philogene
(74) Attorney, Agent, or Firm—Rader, Fishman & Grauer PLLC; Ronald P. Kananen, Esq.

(57) ABSTRACT

A capacitor for outputting a reference signal is formed by using a part of an envelope. A reference signal according to an anode voltage is output from the capacitor for outputting a reference signal. An unnecessary signal component included in an index-detection signal which is output via the capacitor for outputting an index signal is eliminated on the basis of the reference signal. With the configuration, only the required index-information signal is extracted from the index detection signal with high accuracy at a high SN ratio.

7 Claims, 12 Drawing Sheets

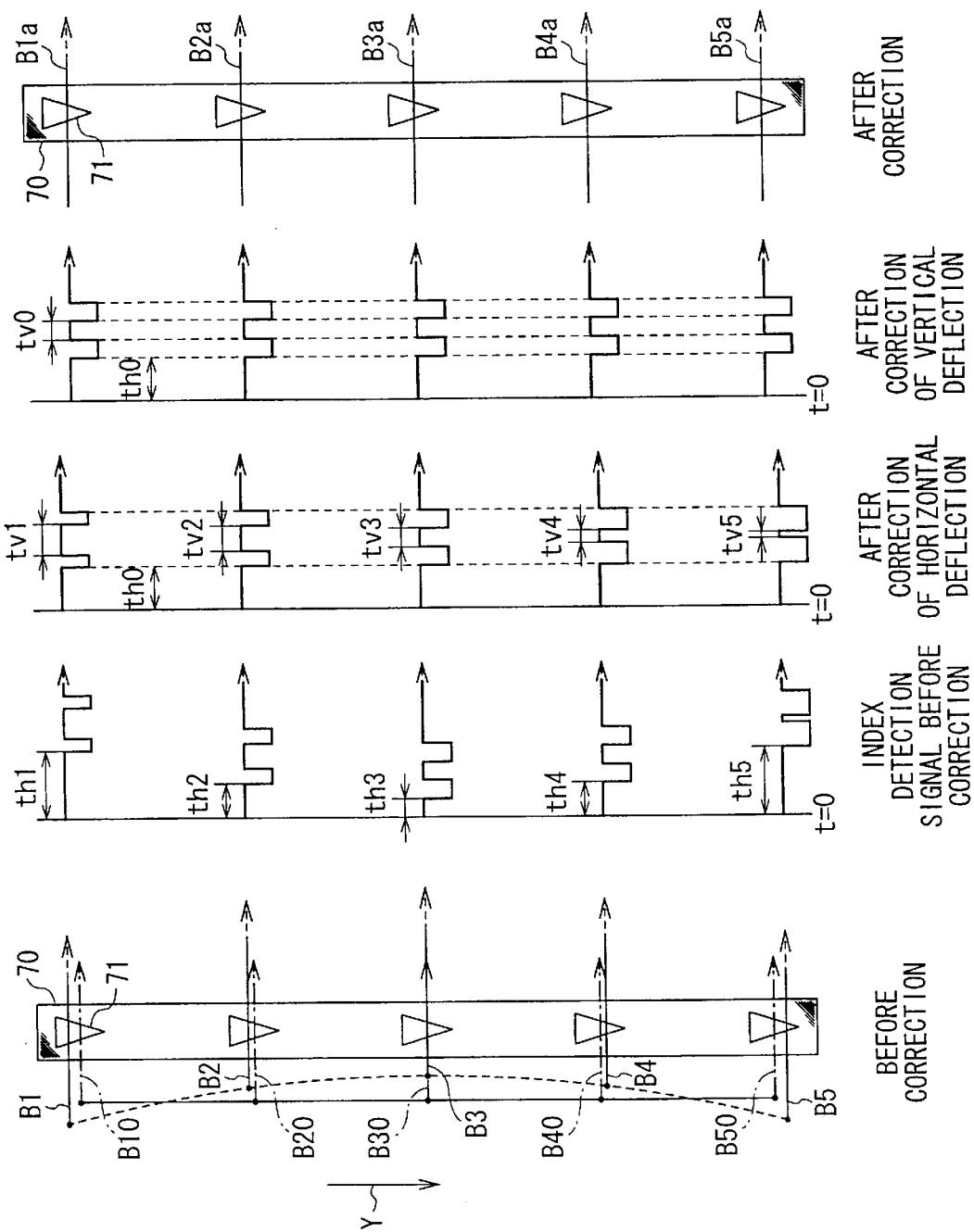

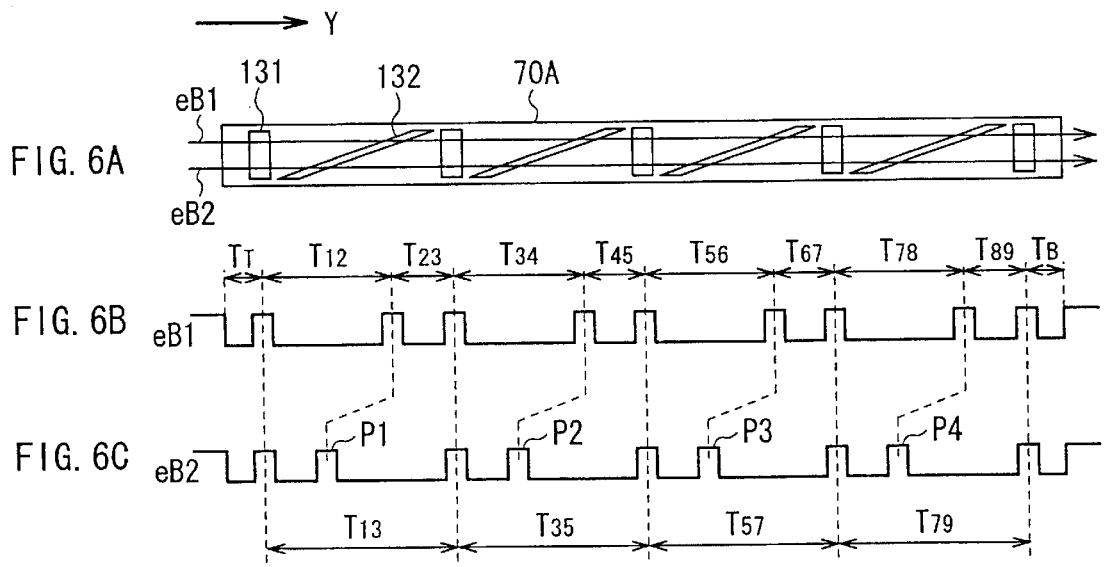
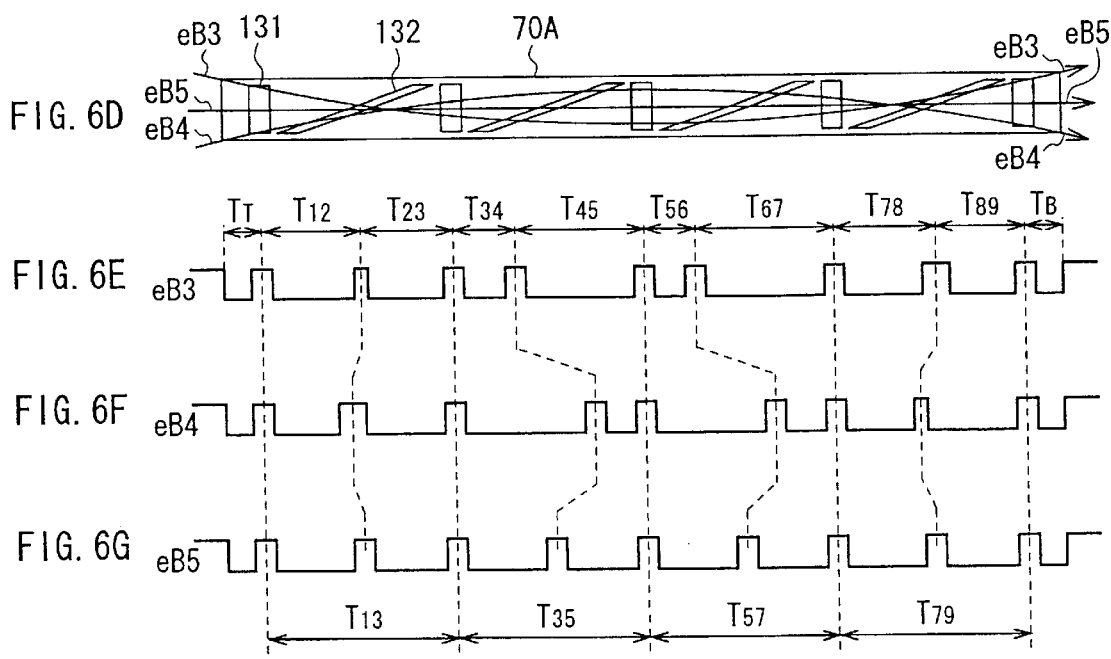

CATHODE RAY TUBE AND SIGNAL DETECTING METHOD IN CATHODE RAY TUBE

BACKGROUND OF THE INVENTION

1. Field of the Invention

The present invention relates to a cathode ray tube used for displaying various kinds of images and a signal-detecting method for detecting a signal used for correcting image-display or the like in the cathode ray tube.

2. Description of the Related Art

A cathode ray tube (CRT) is widely used in an image-display apparatus (such as a television receiver, various monitors, and the like). In the CRT, an electron beam is emitted from an electron-gun provided in the tube toward a phosphor screen and is electromagnetically deflected by a deflection yoke or the like, thereby forming a scan image according to the scan with the electron beam on the tube screen.

A CRT having a single electron-gun is common. In recent years, a CRT having a plurality of electron-guns also is being developed. For example, a CRT for displaying a color image having two electron-guns each for emitting three electron beams of red (R), green (G), and blue (B) has been developed. In the CRT of an in-line electron-gun type, a plurality of split-picture planes are formed by a plurality of electron beams emitted from the plurality of electron-guns and are joined, thereby forming a single picture plane. In such a manner, an image is displayed. For example, the technique related to the CRT of the in-line, electron-gun type is disclosed in Japanese Patent Laid-open No. Sho 50-17167, and the like. Such a CRT of the in-line electron-gun type has an advantage that a larger screen can be achieved while reducing the depth as compared with a CRT using a single electron-gun.

It is conventionally known that the display state of an image on a CRT changes according to use conditions. For example, according to environments under which a CRT is used, an influence of an external magnetic field, such as the earth's magnetic field, varies, and it causes distortion in an image called "raster distortion". In the case of a CRT for displaying a color image, a color shift called "misconvergence" in which a scan position of an electron beam for each color shifts on a tube screen, or the like occurs. Such a change in the display state exerts an adverse influence on the precision of the display state in the joint portion in the in-line electronic-gun-type CRT.

The inventor herein has proposed, in Japanese Patent 3068115 and the like, a technique of outputting an electric detection signal in accordance with a scan position of an electron beam and using the detection signal to correct a display state of an image. In the proposal, an electrode called an index electrode is provided in an overscan area of the electron beam in the tube and an electric signal is output from the index electrode in accordance with incidence of an electron beam (hereinbelow "electric index method"). In the electric index method, an electric signal detected by the index electrode is output to the outside of an envelope via a capacitor formed by using a part of the envelope forming the CRT. By using the electric index method, the path of the scan of an electron beam can be directly detected. By using the electric index method, a displacement of the path of an electron beam in each of various positions can be measured, so that there is the advantage that the display state of an image can be finely corrected.

An electric signal extracted by the above-mentioned electric index method (hereinbelow, also called an "index signal") includes, as shown in FIG. 1, not only necessary information regarding the path of the electron beam (hereinbelow, also called "index information") but also various unnecessary signal components included in an anode voltage. A portion indicated by reference numeral 202 in FIG. 1 denotes a signal portion indicative of the index-information required. FIG. 2 is an enlarged view of the signal portion 202 indicative of the index information. The unnecessary signal components include, for example, a flyback transformer for generating a high voltage and H-cycle (horizontal-cycle) pulses generated by a deflection yoke (reference numeral 201 in FIG. 1).

As shown in FIGS. 1 and 2, although the value of the horizontal-cycle pulse signal as an unnecessary signal component is, for example, 10V or higher, the value of the pulse signal indicative of the necessary index-information is only about 100 mV. When the signal value of the unnecessary signal component is much larger than that of the necessary signal component, the SN (signal-to-noise) ratio deteriorates and deterioration in precision in extracting the necessary index-information is caused. The deterioration in precision in extracting the index-information exerts an influence on the precision of correction in the case where the index-information is used for correcting the display state of an image.

As a method of extracting the index-information with high precision, a method of eliminating unnecessary waveform components by using a circuit such as a filter can be considered. In the case of extracting a signal with high precision by using the filter circuit, however, the problem that a very complicated circuit is necessary arises.

SUMMARY OF THE INVENTION

The present invention has been achieved in consideration of the above-described problems, and its object is to provide a cathode ray tube capable of accurately extracting a necessary signal component from an electrical detection signal that is output in accordance with the incidence of an electron beam without using a complicated circuit configuration and a signal-detecting method in the cathode ray tube.

A cathode ray tube according to the invention has: an envelope; an anode voltage portion to which an anode voltage is supplied; an electron-gun for emitting an electron beam for scanning a valid picture-plane area and an overscan area outside of the valid picture-plane area; first signal-output means for outputting an electric detection signal according to the incidence of the electron beam for scanning the overscan area; and second signal-output means connected to the anode voltage portion, for outputting a reference signal according to the anode voltage. The cathode ray tube according to the invention further includes signal-extracting means for eliminating an unnecessary signal component included in the detection signal on the basis of the reference signal and extracting and outputting a necessary signal component.

A signal-detecting method in a cathode ray tube according to the invention is applied to a cathode ray tube having an envelope, an anode voltage portion to which an anode voltage is supplied, and an electron-gun for emitting an electron beam for scanning a valid picture-plane area and an overscan area outside of the valid picture-plane area. The signal-detecting method according to the invention, in such a cathode ray tube, includes the steps of outputting an electric detection signal in accordance with the incidence of the electron beam for scanning the overscan area; outputting a reference signal according to the anode voltage supplied to the anode voltage portion; eliminating an unnecessary signal component included in the detection signal on the basis of the reference signal; and extracting and outputting a necessary signal component.

In the cathode ray tube and the signal-detecting method in the cathode ray tube according to the invention, the electric detection signal is output in accordance with the incidence of the electron beam scanning the overscan area, and the reference signal according to the anode voltage supplied to the anode voltage portion is output. An unnecessary signal component included in the detection signal is eliminated on the basis of the reference signal, and the necessary signal component is extracted and output.

Other and further objects, features and advantages of the invention will appear more fully from the following description.

BRIEF DESCRIPTION OF THE DRAWINGS

FIG. 3B is front view showing a scan direction of an electron beam in the cathode ray tube; and FIG. 3A is a cross section taken along line IA-IA of FIG. 3B.

FIGS. 5A to 5E are explanatory diagrams showing the structure of an index electrode in the CRT according to a first embodiment of the invention and a position-detecting operation using the index electrode.

FIGS. 6A to 6G are explanatory diagrams showing the structure of an index electrode in the case of performing a main scan in the vertical direction and a position-detecting operation using the index electrode.

DETAILED DESCRIPTION OF THE PREFERRED EMBODIMENTS

Embodiments of the invention will be described in detail hereinbelow with reference to the drawings.

First Embodiment

Figure 1:
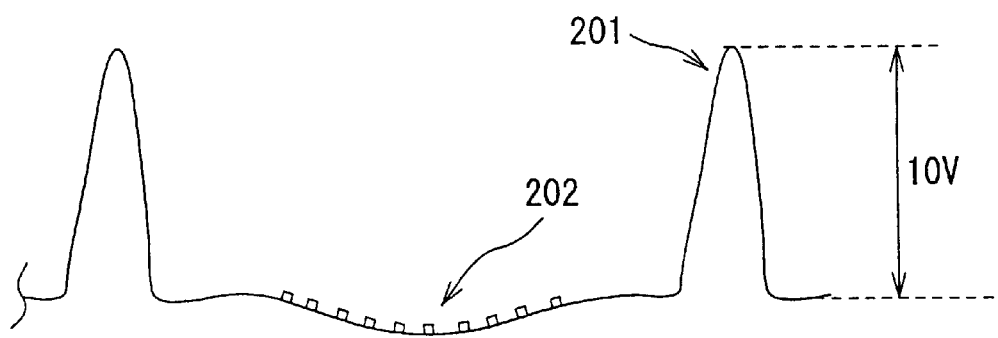
FIG. 1 is an explanatory diagram showing an index-information Si and an unnecessary signal component included in an output signal from an index electrode.
Figure 2:
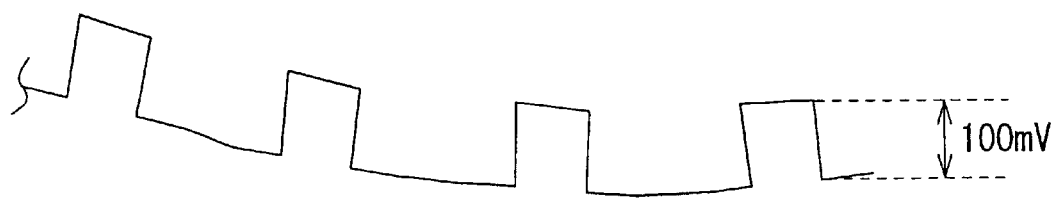
FIG. 2 is an enlarged view of the index signal portion shown in FIG. 1.
Figures 3A, 3B:
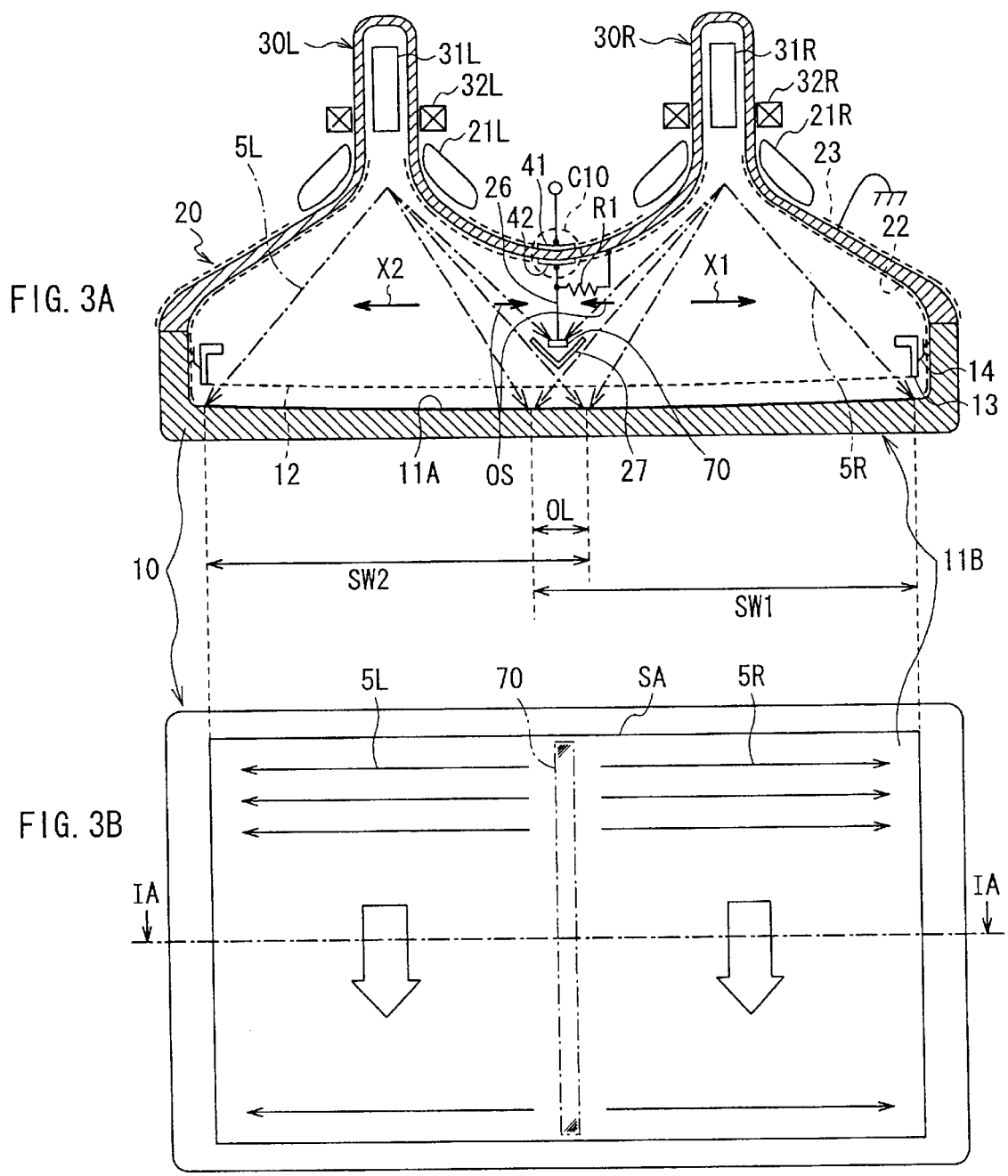
FIGS. 3A and 3B are diagrams schematically showing a cathode ray tube according to a first embodiment of the invention.

As shown in FIGS. 3A and 3B, a cathode ray tube according to the embodiment has a panel portion 10 in which a phosphor screen 11A is formed and a funnel portion 20 integrated with the panel portion 10. On the right and left sides of a rear end portion of the funnel portion 20, two elongated neck portions 30R and 30L having therein electron-guns 31R and 31L, respectively, are formed. The entire shape forming the CRT also is called an "envelope". The opening of the panel portion 10 and that of the funnel portion 20 are fusion connected to each other, and the inside of the envelope is maintained in a state of high vacuum. In the phosphor screen 11A, a phosphor pattern which emits light by an incident electron beam is formed. The surface of the panel portion 10 serves as an image-display screen (tube screen) 11B on which an image is displayed by light emission of the phosphor screen 11A.

The components of the envelope are made mainly of a glass material. The envelope is provided with a capacitor C10 for outputting an index signal and a capacitor C21 for outputting a reference signal, which will be described hereinafter. In FIG. 3A, only the capacitor C10 for outputting an index signal is shown, and the capacitor C21 for outputting a reference signal is not illustrated. The capacitor C10 for outputting an index signal corresponds to a concrete example of a first capacitor in the invention, and the capacitor C21 for outputting a reference signal corresponds to a concrete example of a second capacitor in the invention.

At the inside of the CRT, a color-selection mechanism 12 is disposed so as to face the phosphor screen 11A. The color-selection mechanism 12 is called an aperture grille or a shadow mask according to a variation of the system. The periphery of the color-selection mechanism 12 is supported by a frame 13 and is attached to the inner face of the panel portion 10 via a supporting spring 14 provided for the frame 13.

The funnel portion 20 is provided with an anode terminal (anode button) for applying an anode voltage HV (not shown in FIGS. 3A and 3B). To the peripheral portion from the funnel portion 20 to the neck portions 30R and 30L, deflection yokes 21R and 21L and convergence yokes 32R and 32L are attached. The deflection yokes 21R and 21L are used to deflect electron beams 5R and 5L emitted from the electron-guns 31R and 31L, respectively. The convergence yokes 32R and 32L converge the electron beams for respective colors emitted from the electron-guns 31R and 31L.

The inner peripheral face from the neck portion 30 to the phosphor screen 11A of the panel portion 10 is covered with an inner conductive film 22. The inner conductive film 22 is electrically connected to an anode terminal (not shown). The anode voltage HV is applied to the inner conductive film 22 via the anode terminal. The outer peripheral face of the funnel portion 20 is covered with an outer conductive film 23.

Each of the electron-guns 31R and 31L has, although not shown, three cathodes for R (Red), G (Green), and B (Blue), a heater for heating each cathode, and a plurality of grid electrodes disposed in front of the cathodes. In the electron-guns 31R and 31L, when the cathode is heated by the heater and a cathode-drive voltage of a magnitude according to a video signal is applied to the cathode, the cathode emits thermoelectrons of an amount according to the video signal. When the anode voltage HV, a focus voltage, or the like is applied to the grid electrode, the grid electrode forms an electron lens system to exert a lens action on an electron beam emitted from the cathode. By the lens action, the grid electrode converges an electron beam emitted from the cathode, controls the emission amount of the electron beams, performs an acceleration control, and the like. The electron beams for respective colors emitted from the electron-guns 31R and 31L are incident on the phosphors of corresponding colors in the phosphor screen 11A via the color-selection mechanism 12 or the like.

By referring to FIGS. 3B and 4, the outline of the scanning method of an electron beam in the CRT will be described. In the CRT, almost the left half of a picture-plane is formed with the electron beam 5L emitted from the electron-gun 31L disposed on the left side. Almost the right half of the screen is formed with the electron beam 5R emitted from the electron-gun 31R disposed on the right side. By joining the ends of the split-picture planes formed by the right and left electron beams 5R and 5L so as to be partially overlapped with each other, a single-picture plane SA is formed as a whole, thereby forming an image. The central portion of the picture-plane SA formed as a whole is an area OL in which the right and left split-picture planes are overlapped with each other. The phosphor screen 11A in the overlapped area OL is shared by the electron beams 5R and 5L.

The scan method shown in FIG. 3B performs what is called line-scan (main scan) in the horizontal direction and carries out what is called field-scan in the vertical deflection direction from top to bottom. In the example of the scan shown in FIG. 3B, the line-scan is performed with the left electron beam 5L from right to left (direction X2 in FIG. 3A) in the horizontal deflection direction when seen from the image-display screen side. On the other hand, the line-scan is performed with the right electron beam 5R in the horizontal deflection direction from left to right (direction of X1 in FIG. 3A) when seen from the image-display screen side. In the example of the scan in FIG. 3B, therefore, the line-scan with the electron beams 5R and 5L is performed horizontally from the center portion of the screen towards the opposite outsides, and the field-scan is performed from top to bottom, as in a general cathode ray tube. In the scan method, the line-scan with the electron beams 5R and 5L also may be performed in the directions opposite to those of FIG. 3B from the outer sides of the screen toward the central portion of the screen. The scan directions of the electron beams 5R and 5L may be set to the same direction.

Figure 4:
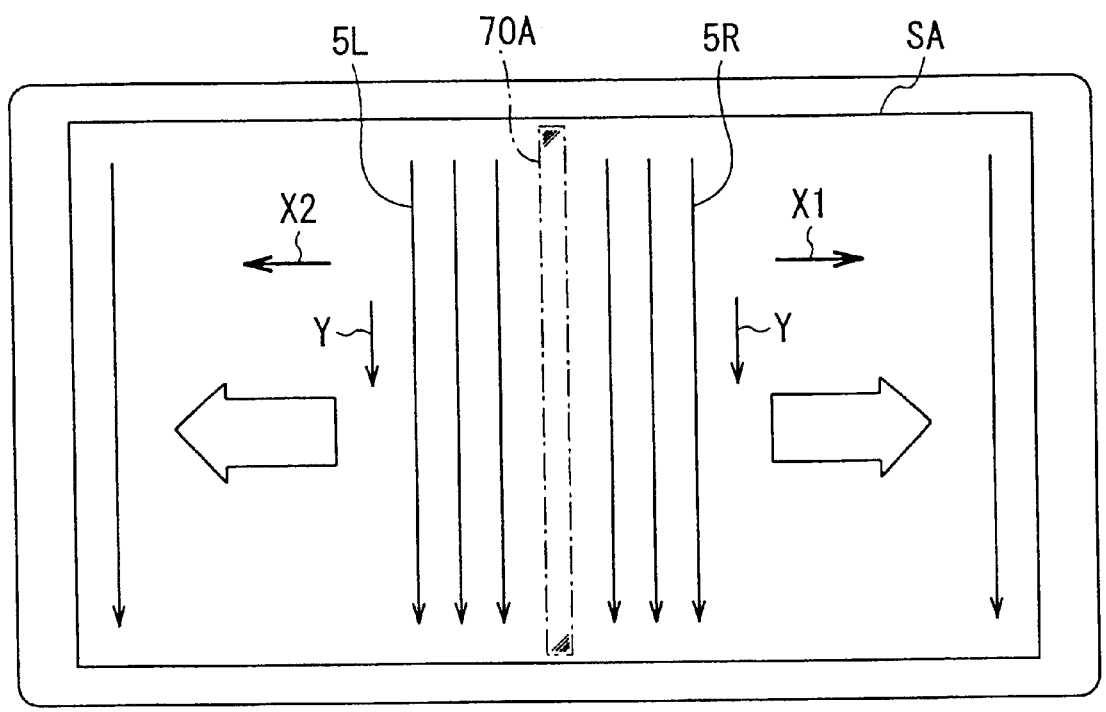
FIG. 4 is an explanatory diagram showing another example of the scan directions of electron beams.

The line-scan and the field-scan with the electron beams 5R and 5L in a scan method shown in FIG. 4 are performed in the reverse directions of those in the scan method shown in FIG. 3B. Since the line-scan is performed in the vertical direction, the scan method is also called a vertical-scan method. In the example of the scan shown in FIG. 4, the line-scan with the electron beams 5R and 5L is performed from top to bottom (Y direction in FIG. 4). On the other hand, the field-scan with the left electron beam 5L is performed from right to left (X2 direction) when it is seen from the image-display screen side, and the field-scan with the right electron beam 5R is performed from left to right (X1 direction) when it is seen from the image-display screen side. In the example of the scan in FIG. 4, therefore, the field-scan with the electron beams 5R and 5L is performed horizontally from the center portion in the screen toward the outside in opposite directions. In the scan method, the field-scan with the electron beams 5R and 5L also may be performed from the outer sides of the screen toward the center portion of the screen.

In an over-scan area OS of the electron beams 5R and 5L in the joint portion of the neighboring right and left split-picture planes in the cathode ray tube, an index electrode 70 in a rectangular flat-plate shape is provided in a position facing the phosphor face 11A. The index electrode 70 is provided in a position corresponding to the overlapped area OL in the tube. Between the index electrode 70 and the phosphor screen 11A, a beam shield 27 as a shielding member against the electron beams 5R and 5L is disposed. The beam shield 27 has the function of shielding against the electron beams 5R and 5L so that the electron beams 5R and 5L over-scanning the over-scan area OS do not reach the phosphor screen 11A and accidentally make the phosphor emit light. The beam shield 27 is, for example, provided so as to be suspended by the frame 13 for supporting the color-selection mechanism 12 as a base. The beam shield 27 is electrically connected to the inner conductive film 22 via the frame 13, so that the anode voltage HV is supplied to the beam shield 27.

The index electrode 70 in FIG. 3A has the function of outputting an electric detection signal according to the incidence of each of the electron beams 5R and 5L. In the index electrode 70, as shown in FIG. 5A, a plurality of notched holes 71 each having an inverted-triangle shape are provided at equal intervals in the longitudinal direction. The index electrode 70 is made of a conductive material, such as a metal, and, for example, is suspended via a not-illustrated insulating member by using the frame 13 as a base. The index electrode 70 is electrically connected to an end of a resistor R1. The other end of the resistor R1 is electrically connected to a portion (for example, the frame 13 or the like) to which the anode voltage is supplied. To the index electrode 70, therefore, the anode voltage HV is supplied via the resistor R1. The index electrode 70 also is electrically connected to an internal electrode 42 of the capacitor C10 for outputting an index signal which will be described hereinafter via a lead wire 26. In the tube, usually, stray capacitance is generated between the index electrode 70 and the beam shield 27 and between the index electrode 70 and the inner conductive film 22. The shape of the notched hole provided in the index electrode 70 and the arrangement of the notched holes are not limited to those shown in FIG. 5A.

When the overscanned electron beams 5R and 5L are incident on the index electrode 70, the electric potential in the index electrode 70 drops than usual. In the CRT, the voltage-dropped signal is led as an index-detection signal to the outside of the tube via the capacitor C10 for outputting the index signal and is used mainly for correcting an image state.

In the case of a vertical-scan method, the index electrode 70A having a structure, for example, as shown in FIG. 6A is provided. The index electrode 70A has a first notched hole 131 having a rectangle shape provided so that its longitudinal direction is perpendicular to the line-scan direction (Y direction) of the electron beams 5R and 5L, and a second notched hole 132 having an elongated shape provided so as to be oblique to the field-scan direction (X1 and X2 directions in FIG. 4) of the electron beams 5R and 5L. A plurality of first notched holes 131 and a plurality of second notched holes 132 are alternately arranged. In the example of FIG. 6A, the first notched holes 131 are arranged at both ends of the index electrode 70A.

Figure 7:
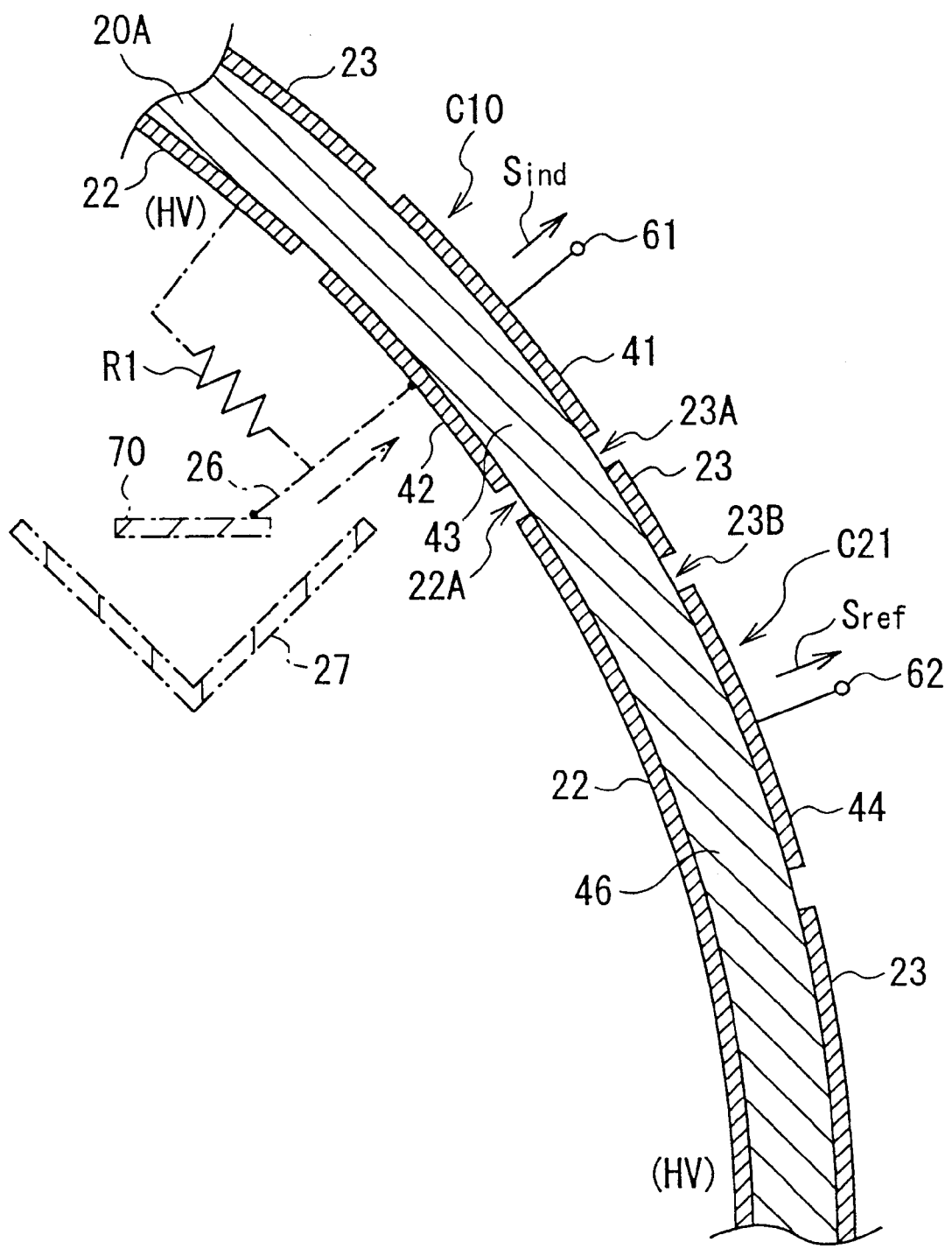
FIG. 7 is a cross section showing the configuration of a capacitor for outputting an index signal and a capacitor for outputting a reference signal.
Figure 8A:
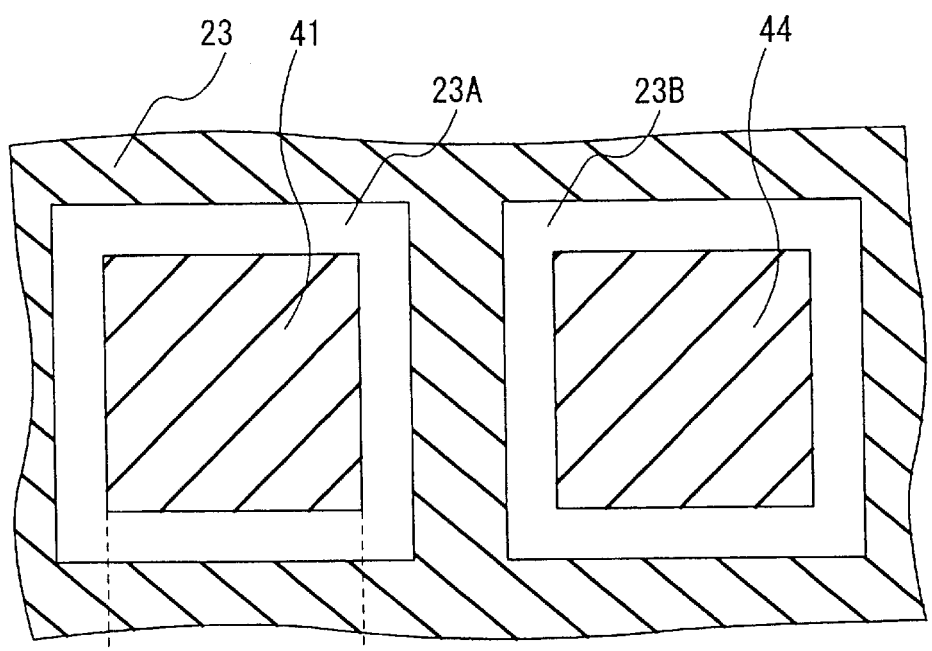
FIG. 8A shows the structure of an external electrode portion.
Figure 8B:
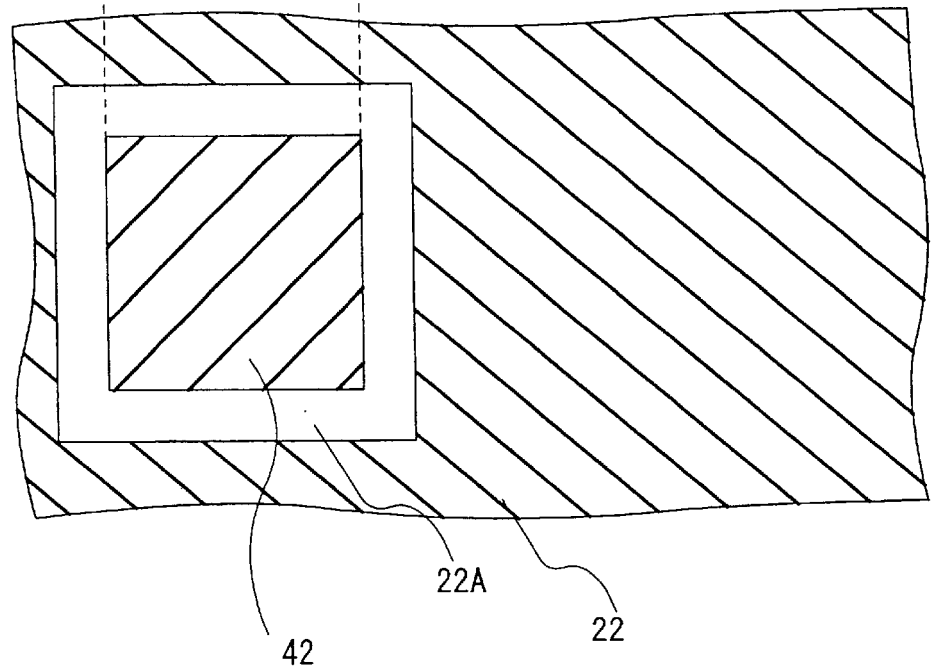
FIG. 8B illustrates the structure of an internal electrode portion.
Figure 9:
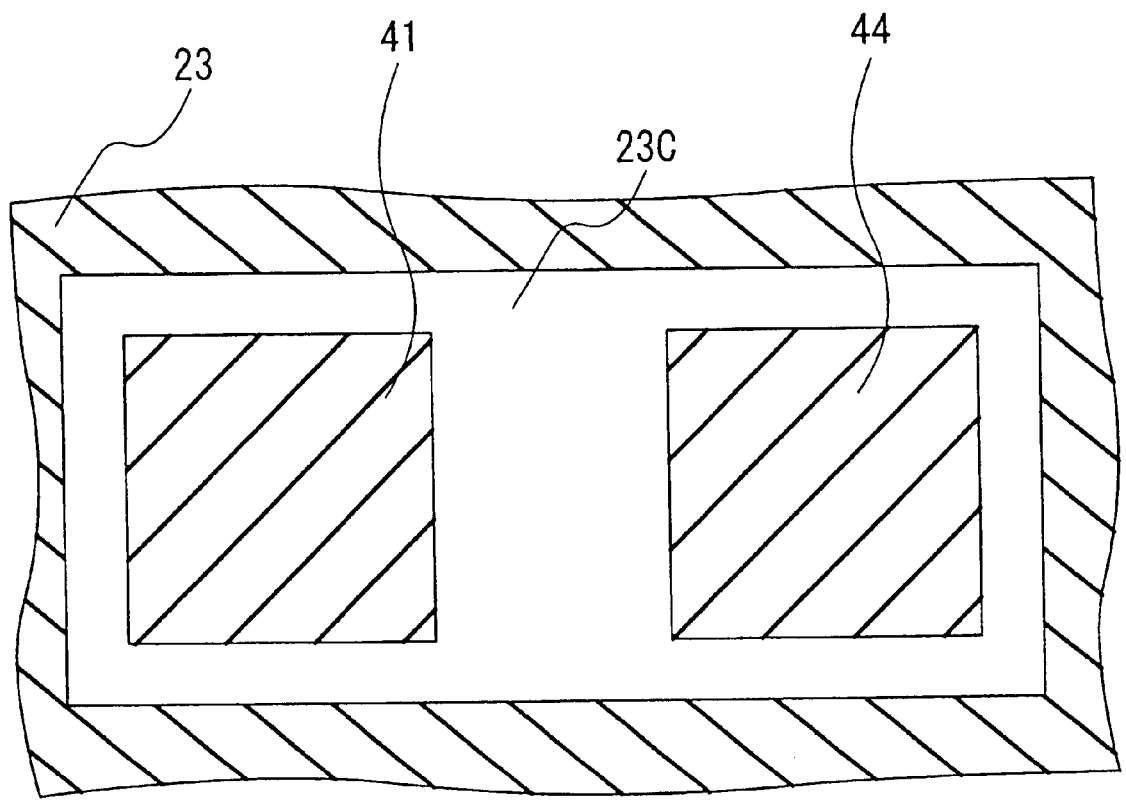
FIG. 9 is a structure diagram showing another example of the structure of the electrode portion in the capacitors for outputting the signals.

FIGS. 7 to 9 show the structure of the capacitor C10 for outputting the index signal and the capacitor C21 for outputting the reference signal. Each of the capacitor C10 for outputting an index signal and the capacitor C21 for outputting a reference signal is formed by using a part of a dielectric element in the envelope such as the panel portion 10 and the funnel portion 20, as a dielectric.

The capacitor C10 for outputting an index signal is used to output an electric index-detection signal $S_{ind}$ generated by the index electrode 70 to the outside of the envelope. The capacitor C10 for outputting an index signal has an external electrode 41 for outputting an index signal provided on the outside of the tube, an internal electrode 42 for outputting an index signal provided on the inside of the tube, and a dielectric portion 43 formed by using a part of a dielectric component 20A such as the funnel portion 20. The external electrode 41 and the internal electrode 42 are disposed so as to face each other with the dielectric portion 43 in-between as shown in FIG. 7.

The external electrode 41 for outputting an index signal is provided, as shown in FIG. 8A, in an area 23A formed in the funnel portion 20, which is electrically insulated from the external conductive film 23. As shown in FIG. 7, the external electrode 41 is electrically connected to an output terminal 61 for outputting the index-detection signal $S_{ind}$. The index-detection signal $S_{ind}$ output to the output terminal 61 is input to a signal-extracting circuit 50 (FIG. 10), which will be described hereinafter. The internal electrode 42 for outputting an index signal is provided in an area 22A in the funnel portion 20, which is electrically insulated from the internal conductive film 22. The internal electrode 42 is electrically connected to the index electrode 70 via the lead wire 26. The external electrode 41 and the internal electrode 42 are formed, for example, in a square shape of the same size as shown in FIGS. 8A and 8B. The shape of the external electrode 41 and that of the internal electrode 42 are not limited to the square shape but may be another shape (for example, a circle shape). The external electrode 41 and the internal electrode 42 do not always have to have the same size.

The capacitor C21 for outputting the reference signal is used to output the reference signal Sref to the outside of the envelope. As will be described hereinafter, the reference signal $S_{ref}$ is a signal used to extract a necessary index-information signal S2 from the index-detection signal $S_{ind}$. The capacitor C21 for outputting a reference signal has an external electrode 44 for outputting a reference signal provided on the outside of the tube and a dielectric portion 46 formed by using a part of the dielectric component 20A such as the funnel portion 20. The capacitor C21 for outputting a reference signal is formed by using the internal conductive film 22 as an electrode. That is, the capacitor C21 for outputting a reference signal has a capability for storing electric charges (capacitance) by disposing, as shown in FIG. 7, the external electrode 44 for outputting a reference signal so as to face the internal conductive film 22 with the dielectric portion 46 in-between. Since the anode voltage HV is applied to the internal conductive film 22, the reference signal $S_{ref}$ using the anode voltage HV is output from the capacitor C21 for outputting a reference signal.

The external electrode 44 for outputting a reference signal is provided, for example as shown in FIG. 8A, in an area 23B in the funnel portion 20, which is electrically insulated from the external conductive film 23. As shown in FIG. 7, the external electrode 44 is electrically connected to an output terminal 62 for outputting a reference signal $S_{ref}$. The reference signal Sref output to the output terminal 62 is input to the signal-extracting circuit 50, which will be described hereinafter. The external electrode 44 is formed in a square shape as shown in FIG. 8A. The shape of the external electrode 44 is not limited to a square shape but may be another shape (for example, a circle shape).

The external electrode 41 for outputting an index signal and the external electrode 44 for outputting a reference signal may be provided in a common insulated area 23C, as shown in FIG. 9. Although each of the insulated areas is formed in a rectangular shape in the example shown in the diagrams, the shape of the insulated area may be another shape (for example, a circular shape).

Figure 10:
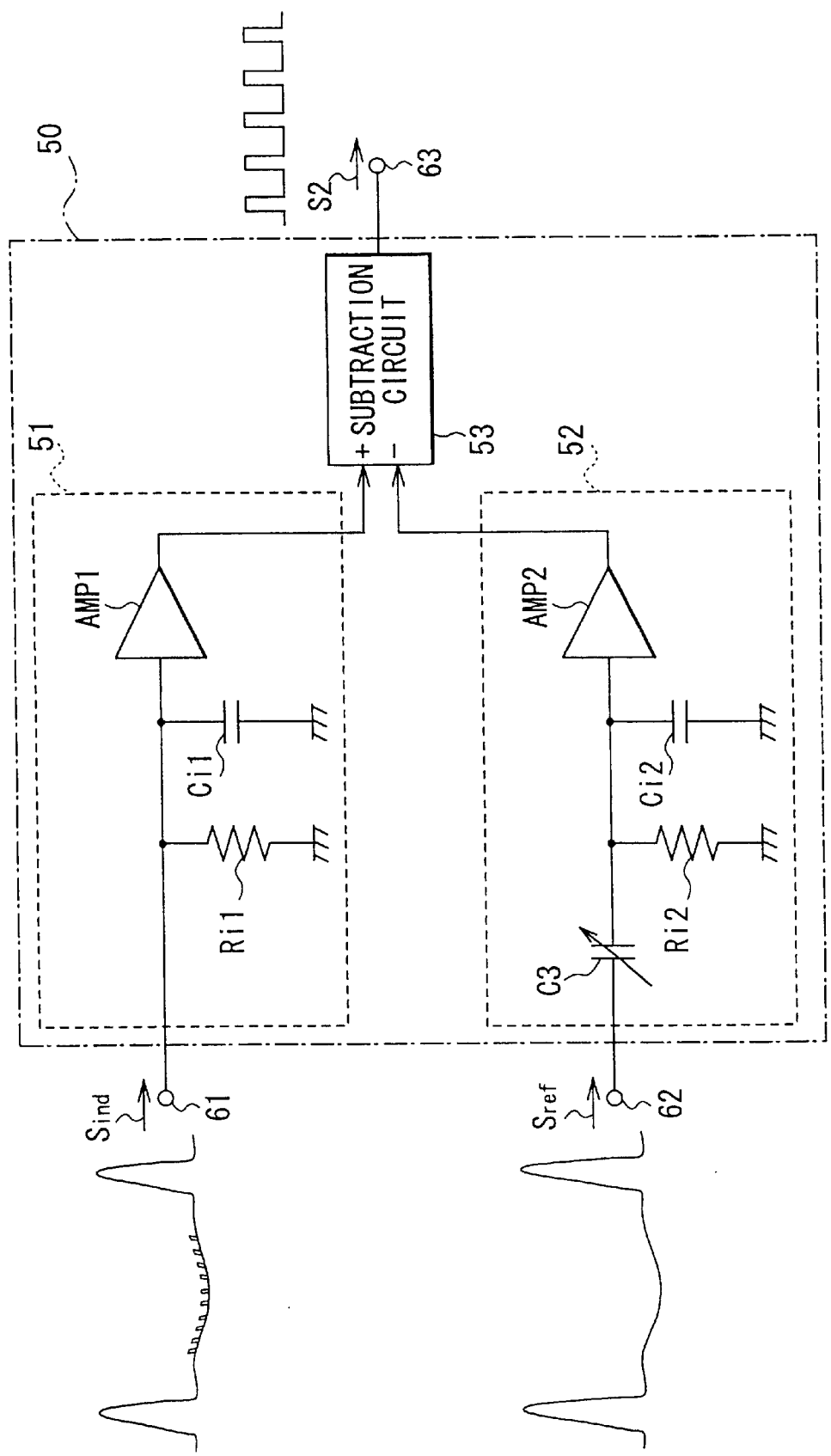
FIG. 10 is a circuit diagram showing an example of a circuit for extracting an index-information signal.

FIG. 10 shows a signal-extracting circuit for extracting the index-information signal S2 from the index-detection signal $S_{ind}$ by using the reference signal $S_{ref}$. The signal-extracting circuit 50 has an index signal-output circuit 51 for amplifying the index-detection signal $S_{ind}$ and outputting the amplified signal and a reference signal-output circuit 52 for amplifying the reference signal Sref and outputting the amplified signal. The signal-extracting circuit 50 also has a subtraction circuit 53 for calculating the difference between the index-detection signal Sind amplified by the output circuit 51 and the reference signal $S_{ref}$ amplified by the output circuit 52 and outputting the difference as the index-information signal S2 included in the index-detection signal $S_{ind}$. The subtraction circuit 53 is connected to an output terminal 63 for outputting the index-information signal S2. The index-information signal S2 is input to an index-signal-processing circuit 105 (FIG. 11) which will be described hereinafter via the output terminal 63.

The output circuit 51 has an amplifier AMPI for signal amplification, and an input resistor Ri1 and an input capacitor Ci1 for the amplifier AMP1. The input terminal of the amplifier AMP1 is connected to the output terminal 61 to receive the index-detection signal $S_{ind}$. An output terminal of the amplifier AMP1 is connected to one of input terminals of the subtracting circuit 53. One end of the input resistor Ril and one end of the input capacitor Ci1 are connected between the output terminal 61 and the input terminal of the amplifier AMP1. The other ends of the input resistor Ril and the input capacitor Ci1 are grounded.

The output circuit 52 has an amplifier AMP2 for signal amplification, and an input resistor Ri2 and an input capacitor Ci2 for the amplifier AMP2. The output circuit 52 further has an adjustment capacitor C3 for matching the signal waveform of the index-detection signal $S_{ind}$ with that of the reference signal $S_{ref}$. The input terminal of the amplifier AMP2 is connected to the output terminal 62 via the adjustment capacitor C3 to receive the reference signal Sref via the adjustment capacitor C3. An output terminal of the amplifier AMP2 is connected to the other input terminal of the subtraction circuit 53. One end of the input resistor Ri2 and one end of the input capacitor Ci2 are connected between the adjustment capacitor C3 and the input terminal of the amplifier AMP2. The other ends of the input resistor Ri2 and the input capacitor Ci2 are grounded.

The amplitude of an unnecessary signal component included in the index-detection signal $S_{ind}$ output from the output capacitors C10 and C21 and that of the reference signal $S_{ref}$ vary according to the capacitances of the output capacitors C10 and C21. Consequently, to extract a necessary signal component (index-information signal S2) from the difference between the index-detection signal $S_{ind}$ and the reference signal $S_{ref}$, the amplitudes of the signal components have to be matched with each other. The amplitude of the waveform can be adjusted by, for example, adjusting the sizes of the external electrodes 41 and 44 of the output capacitors C10 and C21 or providing a capacitor for amplitude adjustment or an amplifier on the output side of each of the signal-output capacitors C10 and C21.

In the signal-extracting circuit 50, each of the amplifiers AMP1 and AMP2 and the adjustment capacitor C3 has a function of adjusting the amplitude. By matching the amplitude of the unnecessary signal component included in the index-detection signal $S_{ind}$ and that of the reference signal $S_{ref}$, the index-information signal S2 can be output excellently from the subtraction circuit 53.

Figure 11:
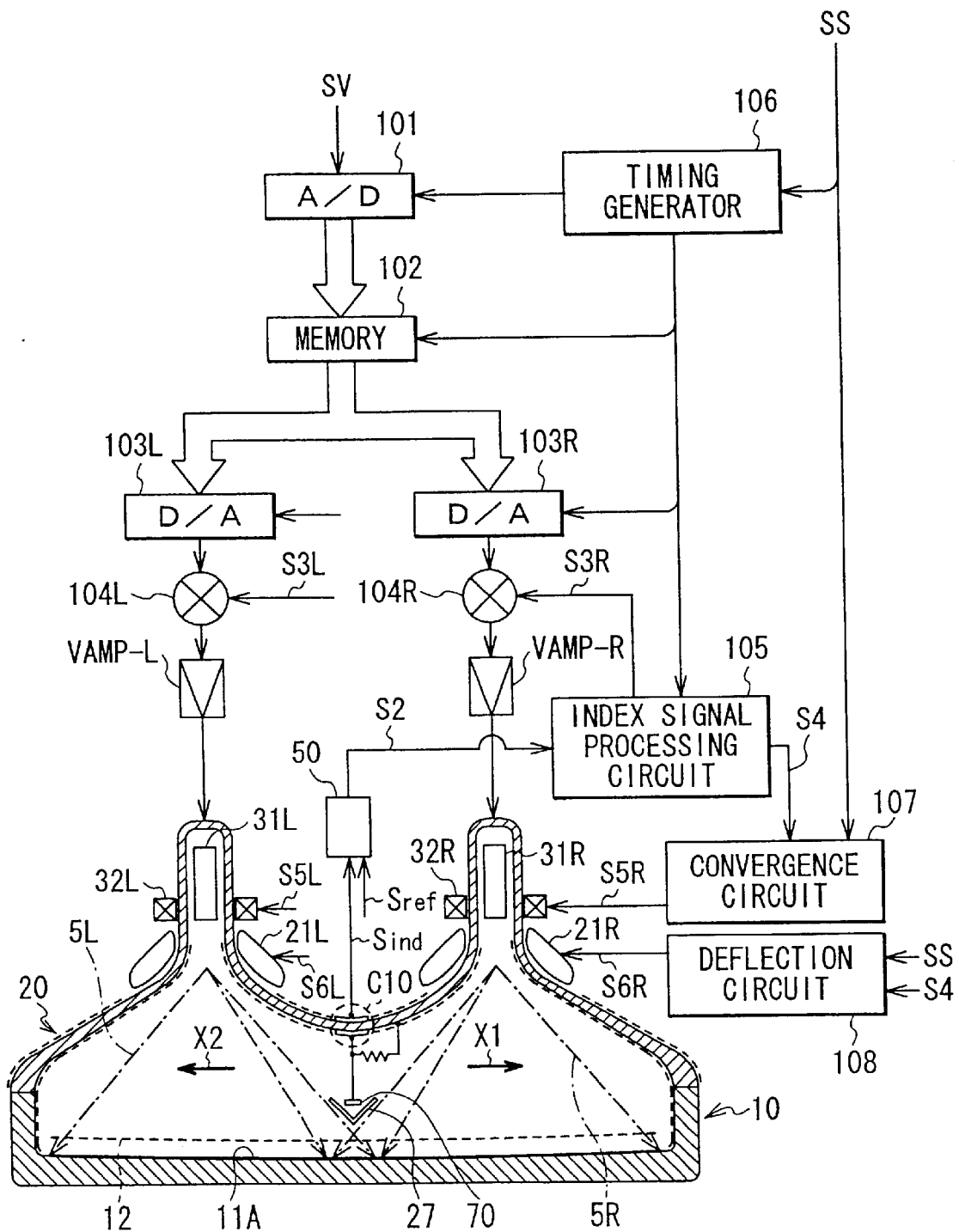
FIG. 11 is a block diagram showing the configuration of a signal processing circuit in the cathode ray tube according to the first embodiment of the invention.

FIG. 11 shows a signal processing circuit of the CRT. The CRT has an analog-to-digital (A/D) converter 101, a memory 102, digital-to-analog (D/A) converters 103R and 103L, modulators 104R and 104L, and video amplifiers VAMP-R and VAMP-L. The CRT also has an index-signal-processing circuit 105, a timing generator 106, a convergence circuit 107, and a deflection circuit 108.

The A/D converter 101 converts an input analog video signal SV to a digital signal. The memory 102 temporarily stores the digital video signal SV converted by the A/D converter 101. The memory 102 takes the form of, for example, a line memory or field memory and stores the input video signals, for instance, on a line unit basis or a field unit basis. An operation of reading/writing a signal from/to the memory 102 is controlled by a not-shown memory controller.

Signals necessary to draw about the left half of an image out of the video signals SV stored in the memory 102 are input to the D/A converter 103L. On the other hand, signals necessary to draw about the right half of an image out of the video signals SV stored in the memory 102 are input to the D/A converter 103R. Each of the D/A converters 103R and 103L converts the input digital signal to an analog signal. The modulator 104L modulates the intensity of a video signal-output from the D/A converter 103L on the basis of a supplied modulation signal S3L. The modulator 104R modulates the intensity of a video signal-output from the D/A converter 103R on the basis of a supplied modulation signal S3R. The video amplifiers VAMP-R and VAMP-L amplify the intensity-modulated video signals output from the modulators 104R and 104L and output amplified signals to the electron-guns 30R and 30L, respectively.

To the index-signal-processing circuit 105, the index information signal S2 output from the subtraction circuit 53 in the signal-extracting circuit 50 is input. The index-signal-processing circuit 105 outputs the modulation signals S3R and S3L for controlling the modulation of the intensity in the joint portion of the right and left split picture planes and a correction signal S4 for correcting raster distortion or the like. The timing generator 106 outputs timing signals to the A/D converter 101, memory 102, D/A converters 103R and 103L, and index-signal-processing circuit 105 on the basis of an input synchronization signal SS. The convergence circuit 107 controls the convergence yokes 32R and 32L on the basis of the correction signal S4 from the index-signal-processing circuit 105. The deflection circuit 108 controls the deflection yokes 21R and 21L on the basis of the correction signal S4 from the index-signal-processing circuit 105.

The operation of the CRT having the configuration described above will now be described.

As an example, the case (FIG. 3B) of horizontally scanning the right and left split-picture planes each having H/2 UH denotes one horizontal scan period) from the center portion of the image toward the opposite outer sides with the electron beams 5R and 5L will be described. Video signals of 1H written in the memory 102 are divided by two (H/2). The signals for the left split-picture are read in the direction opposite to that at the time of writing by the control of the not-illustrated memory controller and input to the D/A converter 103L. The signals for the right split-picture are read in the same direction as that at the time of writing by the control of the not-illustrated memory controller and input to the D/A converter 103R. The D/A converter 103L converts the digital signals for the left split-picture picture-plane of H/2 that are read in the opposite direction into analog signals and outputs the analog signals to the modulator 104L. The D/A converter 103R converts the digital signals for the right split-picture picture-plane of H/2 that are read in the same direction as that at the time of writing into analog signals and outputs the analog signals to the modulator 104R.

The modulators 104R and 104L modulate the intensity of the input video signals on the basis of the modulation signals S3R and S3L and output the resultant signals to the video amplifiers VAMP-R and VAMP-L, respectively. The signals input to the video amplifiers VAMP-R and VAMP-L are amplified to a predetermined level, and the amplified signals are supplied as cathode-drive voltages to not-shown cathodes arranged in the electron-guns 31R and 31L, respectively. By the voltages, the electron beams 5R and 5L are emitted from the electron-guns 31R and 31L, respectively. The CRT according to the embodiment can display a color image. In practice, cathodes for R, G, and B colors are provided for each of the electron-guns 31R and 31L, and the electron beams of R, G, and B are emitted from each of the electron-guns 31R and 31L. The beam current for each color is independently controlled to adjust the intensity and chromaticy of the electron beam of each color.

The right electron beam 5R emitted from the electron-gun 31R and the left electron beam 5L emitted from the electron-gun 31L pass through the color-selection mechanism 12 and are incident on the phosphor screen 11A. The electron beams 5R and 5L are converged by the electromagnetic action of the convergence yokes 32R and 32L and deflected by the electromagnetic action of the deflection yokes 21R and 21L, respectively. By the operations, the whole phosphor screen 11A is scanned with the electron beams 5R and 5L, and a desired image is displayed on the picture-plane SA (FIG. 3B) on the tube screen 11B of the panel portion 10.

When an overscan area OS is scanned with the electron beams 5R and 5L and the electron beams 5R and 5L enter the index electrode 70, a voltage drop occurs in the index electrode 70. A signal according to the voltage drop is output as the index-detection signal $S_{ind}$ to the outside of the tube via the capacitor C10 (FIG. 7) for outputting an index signal. The index-detection signal $S_{ind}$ is input to the index signal-output circuit 51 (FIG. 10) in the signal-extracting circuit 50 via the output terminal 61. On the other hand, the reference signal Sref according to the anode voltage HV is output from the reference signal-output capacitor C21 (FIG. 7). The reference signal $S_{ref}$ is input to the reference signal-output circuit 52 (FIG. 10) in the signal-extracting circuit 50 via the output terminal 62.

The index signal-output circuit 51 amplifies the input index detection signal $S_{ind}$ and outputs the resultant to the subtraction circuit 53 (FIG. 10). The reference signal-output circuit 52 amplifies the input reference signal Sref and outputs the resultant to the subtraction circuit 53. At this time, in the index signal-output circuit 51 and the reference signal-output circuit 52, an adjustment for matching the amplitude of the unnecessary signal component included in the index-detection signal $S_{ind}$ with the amplitude of the reference signal $S_{ref}$ is carried out. The subtraction circuit 53 calculates the difference between the input index-detection signal $S_{ind}$ and the reference signal $S_{ref}$, thereby eliminating the unnecessary signal component included in the index-detection signal $S_{ind}$, extracting only the necessary signal component (index-information signal S2), and outputting the index-information signal S2. The index-information signal S2 output from the subtraction circuit 53 is input to the index-signal-processing circuit 105 via the output terminal 63.

The index-signal-processing circuit 105 analyzes the scan position and the like of the electron beams 5R and 5L on the basis of the input index-information signal S2 and outputs the correction signal S4 for correcting raster distortion or the like on the basis of the result of the analysis. The convergence circuit 107 controls the convergence yokes 32R and 32L on the basis of the correction signal S4 from the index-signal-processing circuit 105. The deflection circuit 108 controls the deflection yokes 21R and 21L on the basis of the correction signal S4 from the index-signal-processing circuit 105. By the operation, the scan position of the electron beam is corrected and raster distortion or the like is corrected. The index-signal-processing circuit 105 outputs the modulation signals S3R and S3L for modulating the intensity in the joint portion of the right and left split-picture screens on the basis of the input index-information signal S2. The modulators 104R and 104L performs intensity modulation based on the modulation signals S3R and S3L on the video signals output from the D/A converters 103R and 103L. By these operations, the intensity in the joint portion in the right and left split screens is corrected. In such a manner, the right and left split-picture planes are properly joined from the viewpoint of position and intensity and displayed.

Referring now to FIGS. 5A to 5E, data obtained by analyzing the detection signal from the index electrode 70 will be described.

FIGS. 5A to 5E show an example of the structure of the index electrode 70 and the waveform of an electric detection signal-output from the index electrode 70. In the CRT, by providing the notched holes 71 in the conductive index electrode 70, the scan positions of the electron beams 5R and 5L in the horizontal direction (line-scan direction) and the vertical direction (field-scan direction) can be detected. The case (FIG. 3B) only with the electron beam 5R, where the line-scan is performed from left to right with respect to the center of the screen and the field-scan is performed from top to bottom (Y direction of the diagrams), will be described.

In FIG. 5A, a path BY denotes a start point of scan in the horizontal direction of the electron beam 5R before image correction. The path BY of the electron beam 5R before the image correction has a pincushion shape in which the center portion in the horizontal direction is narrowed and the upper and lower portions in the horizontal direction are wider. A path BYO shows a scan start point in the horizontal direction of the electron beam 5R in the case where proper image correction is made. In the embodiment, in order to detect the position of the electron beam 5R, in the overscan area OS in which the index electrode 70 is provided, a plurality of electron beams B1 to B5 for position detection of the number corresponding to at least the number of notched holes 71 is allowed to pass. In the following, the description will be based on the assumption that electron beams pass through almost the center in the plurality of notched holes 71, like the illustrated electron beams B10 to B50. The number of electron beams passing the index electrode 70 for position detection is not limited to the number of the notched holes 71.

When the electron beams B1 to B5 for position detection pass through the index electrode 70, as shown in FIG. 5B, detection signals each having two pulse signals are output. The two pulse signals are signals output when any of the electron beams B1 to B5 passes through the electrode portions at both ends of the notched hole 71. The time (th1 to th5) from the scan start point (time t =0) of each of the electron beams BI to B5 to the edge of the first pulse signal (th1 to th5) expresses the amplitude of the horizontal deflection and the state of raster distortion. When all th1 to th5 become equal to predetermined time th0, it means that the horizontal deflection is completely corrected.

FIG. 5C shows a detection signal that is output after the horizontal deflection is corrected. As described above, when the electron beams B1 to B5 pass the portions in which the notched holes 71 are provided in the index electrode 70, two-pulse signals are output. Pulse intervals tv1 to tv5 of pulse signals that are output at this time correspond to the positions in the vertical direction of the notched holes 71. When all the pulse intervals (tv1 to tv5) become predetermined time tvO, it means that the vertical amplitude and linearity are adjusted and the vertical deflection is completely corrected. After both the horizontal deflection and vertical deflection are corrected, as shown in FIG. 5D, a detection signal in which the time from the scan start point (t=O) to the edge portion of the first pulse signal is predetermined time tho, and the interval of two pulses is the predetermined time tvO is output. As shown in FIG. 5E, electron beams B1a to B5a in an ideal state pass almost the center of the plurality of notched holes 71 in the index electrode 70.

An analysis of a pulse signal in the detection signal-output from the index electrode 70 is conducted, in practice, by analyzing the index-information signal S2 obtained through the signal-extracting circuit 50 by the index-signal-processing circuit 105 (FIG. 11). The index-signal-processing circuit 105 outputs the correction signal S4 on the basis of the analysis of the index-information signal S2. The deflection circuit 108 controls the deflection yoke 21R on the basis of the correction signal S4. By the operation, the scan position of the electron beam 5R is controlled and the image is corrected so that raster distortion or the like is corrected.

The CRT can display a color image and the electron beams 5R to be adjusted are for R, G, and B colors. By controlling image data for each of R, G, and B colors, convergence can be corrected automatically. By performing such an automatic control, for example, raster distortion of a pincushion shape as shown by the path BY in FIG. 5A, can be automatically corrected.

The above description relates to the right electron beam 5R, and the picture-plane of almost the right half of the whole picture-plane area is corrected. By performing the operations similarly by the left electron beam 5L, the left picture-plane is corrected. By correcting the right and left split-picture planes, the right and left split-picture planes are properly joined and displayed. Since only one index electrode 70 is provided, the scan positions of the electron beams 5R and 5L cannot be detected perfectly, simultaneously detected. Consequently, the right and left split-picture planes cannot be simultaneously corrected. However, for example, by alternately detecting the scan positions of the electron beams 5R and 5L every line-scan or field-scan to alternately correct the electron beams 5R and 5L, the right and left split-picture planes can be corrected.

The operation of detecting the index signal in the case of the vertical-scan method (FIG. 4) will now be described.

FIGS. 6A to 6G show the structure of the index electrode 70A applied in the case of using the vertical-scan method shown in FIG. 4 and an example of the waveform of a detection signal-output from the index electrode 70A. In FIGS. 6A to 6G, the left side of the drawing sheet corresponds to the upper side of a picture plane, and the right side of the drawing sheet corresponds to the lower side of the picture plane. When it is assumed that two electron beams eB1 and eB2 for position detection pass through the index electrode 70A as shown in FIG. 6A, detection signals as shown in FIGS. 6B and 6C are output. In FIGS. 6B and 6C, the amplitudes and positions in the line-scan of the electron beams eB1 and eB2 can be detected from periods $T_T$ and TB shown at both ends. Whether periods T13, T35, T57, and T79 in which the electron beams eB1 and eB2 pass through the neighboring notched holes 131 are regular or irregular indicates whether the line-scan is performed linearly or not. The positions of the pulse signals (pulses P1 to P4 in FIG. 6C) generated when the electron beams eB1 and eB2 pass through the oblique notched holes 132 indicate information on the amplitude in the field scan.

FIG. 6E shows a detection signal that is output from the index electrode 70A when an electron beam eB3 having a pincushion-shaped raster distortion passes as shown in FIG. 6D. FIG. 6F shows a detection signal that is output from the index electrode 70A when an electron beam eB4 having a barrel-shaped distortion as shown in FIG. 6D passes. FIG. 6G shows a detection signal that is output when there is an electron beam eB5 passing almost the center in the longitudinal direction of the index electrode 70A, as shown in FIG. 6D. As understood from the diagrams, detection signals having different waveforms according to the scan positions and scan timings of the passing electron beams 5R and 5L are output from the index electrode 70A. For example, by measuring and analyzing the phases of the pulse signal train when the electron beams 5R and 5L pass through the notched holes 131 and 132, the paths of the electron beams 5R and 5L on the index electrode 70A can be estimated.

The phase and the like of the pulse signal train of the detection signals output from the index electrode 70A are analyzed by analyzing the index-information signal S2 obtained via the signal-extracting circuit 50 by the index-signal-processing circuit 105 (FIG. 11) in a manner similar to the case using the index electrode 70 in FIG. 5.

The shapes of the notched hole in the index electrodes 70 and 70A are not limited to those shown in the drawings but may be other shapes. For example, the shape of the notched hole 71 provided in the index electrode 70 is not limited to an inverted triangle but can be any of various shapes such as a rhombus, a circle, and an oval.

The number of notched holes provided in the index electrodes 70 and 70A is not limited to that shown in the diagrams but may be larger or smaller than that shown in the diagrams. When the distortion of an image is more complicated and a higher-order component is included, it is considered that an increase in detection accuracy is necessary by increasing the number of notched holes. The intervals of the notched holes are not always equal intervals. In the above description, the scan position of each of the electron beams 5R and 5L is detected by each of the index electrodes 70 and 70A. By providing a plurality of index electrodes 70 and 70A, the scan positions of the electron beams 5R and 5L can be independently detected. In this case, a plurality of capacitors for outputting index signals are independently provided and the index-detection signals generated by the electron beams are independently processed. By providing a plurality of index electrodes 70 and 70A, the scan positions of the electron beams 5R and 5L can be simultaneously and independently detected, and the right and left split-picture planes can be simultaneously corrected.

The timing of controlling the image-display based on the index-information signal S2 can be arbitrarily set, for example, on startup of the CRT, intermittently in regular cycles, or always. The image display can be controlled alternately on the right and left split-picture planes. Further, in the case of employing what is called a feedback loop configuration such that the control result of the image-display is reflected in the next field-scan of each of the electron beams 5R and 5L, even if the installation position or orientation of the CRT is changed during operation of the CRT, raster distortion or the like caused by a change in the external environment such as the earth's magnetic field can be automatically corrected.

As described above, according to the embodiment, the capacitor C21 for outputting a reference signal is provided to output the reference signal $S_{ref}$ according to the anode voltage HV and an unnecessary signal component included in the index-detection signal $S_{ind}$ that is output via the capacitor C10 for outputting an index signal is eliminated on the basis of the reference signal $S_{ref}$. Consequently, only the necessary index-information signal S2 can be extracted with high precision from the index-detection signal $S_{ind}$ in a state where the S/N ratio is high. Thus, in the image correcting system using the electric index method, image correction can be performed with high precision and high reproducibility.

Second Embodiment

A second embodiment of the invention will now be described.

Figure 12:
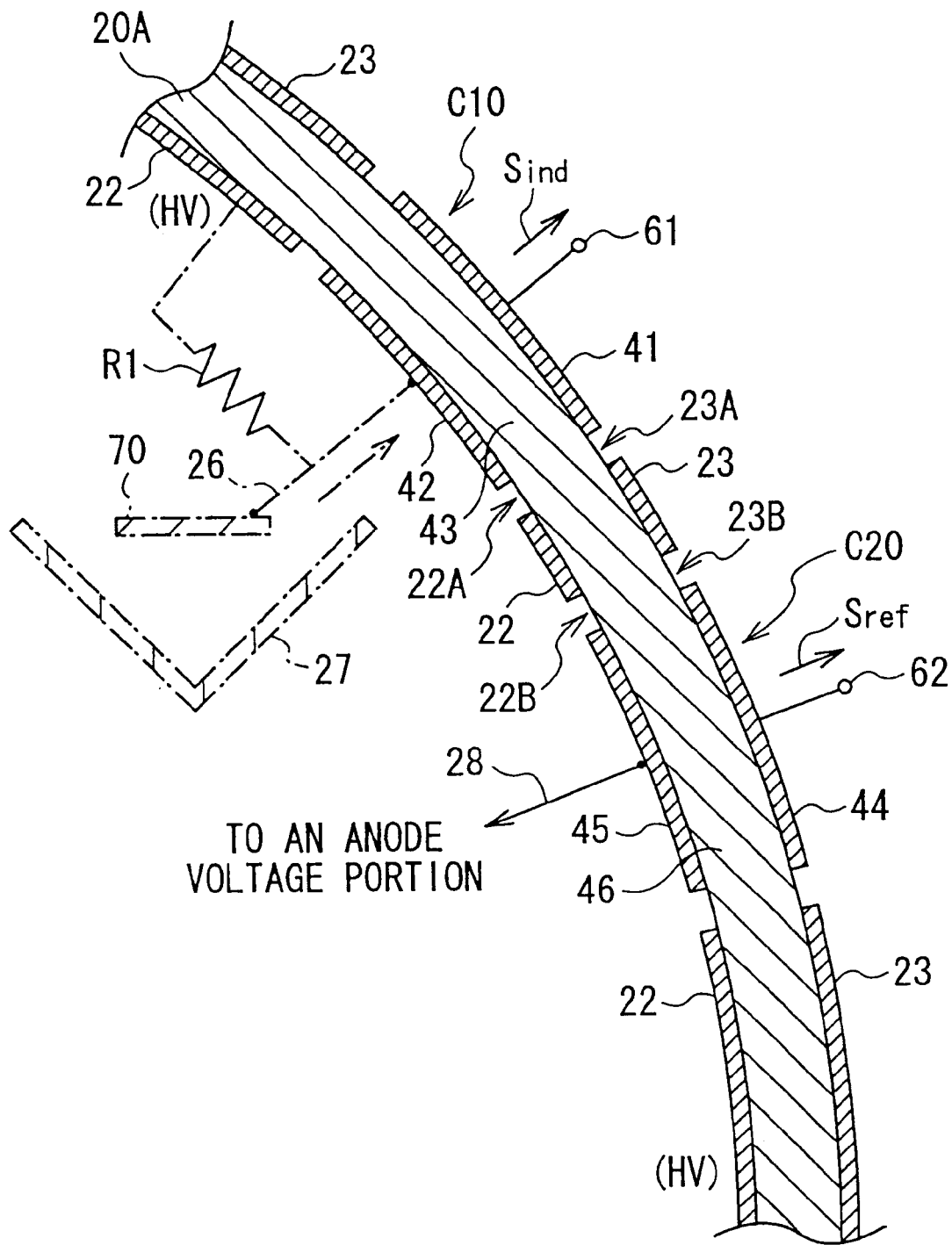
FIG. 12 is a cross section showing the structure of a capacitor for outputting signals in a CRT according to a second embodiment of the invention.
Figure 13A:
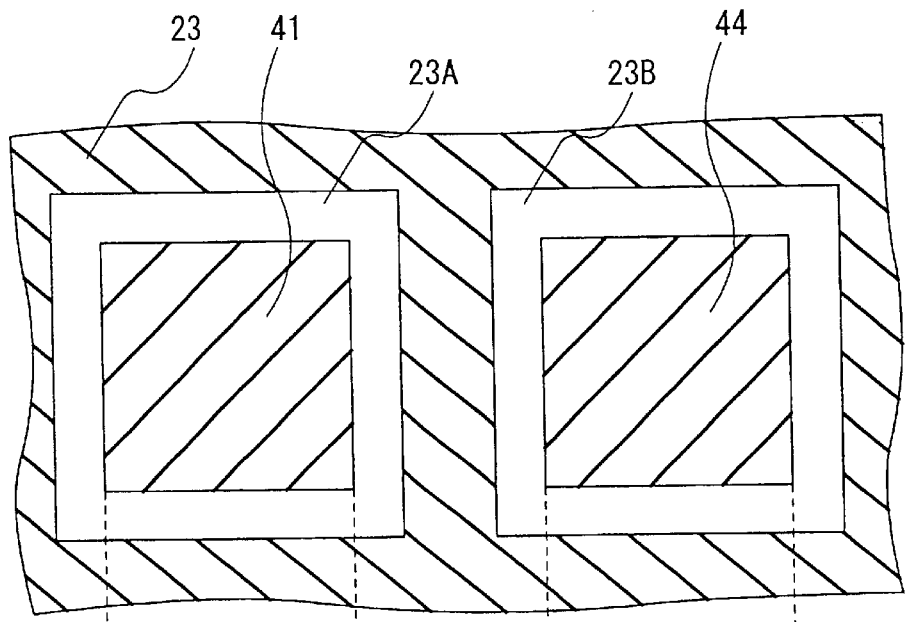
FIG. 13A shows the structure of an external electrode portion of a capacitor for outputting signals.
Figure 13B:
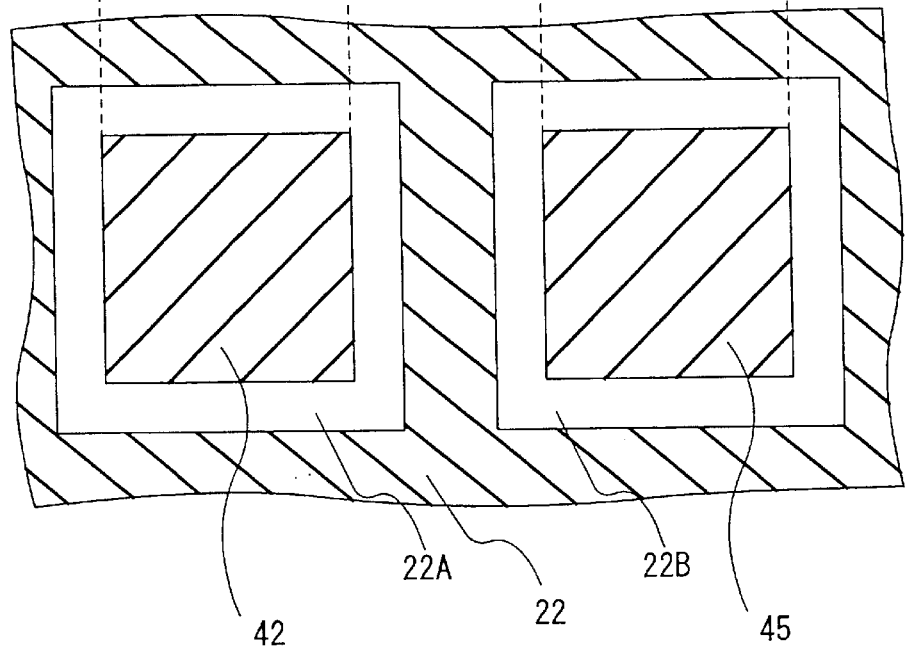
FIG. 13B illustrates the structure of an internal electrode portion of a capacitor for outputting signals.

FIG. 12 and FIGS. 13A and 13B show the configuration of the capacitor C10 for outputting an index signal and the capacitor C20 for outputting a reference signal in a cathode ray tube according to the second embodiment of the invention. The different point of the CRT according to the second embodiment from the CRT of the first embodiment is the portion of the capacitor C20 for outputting a reference signal.

In the first embodiment, the internal conductive film 22 itself is used as the electrode of the capacitor C21 for outputting a reference signal. In the second embodiment, in place of the internal conductive film 22, an internal electrode 45 for outputting a reference signal is provided on the inside of the tube. The internal electrode 45 for outputting a reference signal has a structure similar to that of the internal electrode 42 for outputting an index signal and is provided on the inside of the tube. Specifically, the internal electrode 45 for outputting a reference signal is provided, as shown in FIGS. 13A and 13B, for example, in the area 22B that is electrically insulated from the internal conductive film 22 in the funnel portion 20. As shown in FIG. 12, the internal electrode 45 for outputting a reference signal is disposed so as to face the external electrode 44 for outputting a reference signal with the dielectric portion 46 in-between, which is formed by using a part of the envelope. In such a manner, the capacitor C20 for outputting a reference signal is substantially the same as that of the capacitor C10 for outputting an index signal.

The internal electrode 42 for outputting an index signal and the internal electrode 45 for outputting a reference signal may be provided in a common insulated area. The shape of the internal electrode 42 and the internal electrode 45 is not limited to the rectangle but can be other shape (such as circle shape). The sizes of the electrodes do not always have to be the same.

The internal electrode 45 for outputting a reference signal is electrically connected to an anode voltage portion (for example, the frame 13 (FIG. 3A and the like) to which the anode voltage HV is supplied via the lead wire 28. Consequently, the anode voltage HV is supplied via the lead wire 28 to the internal electrode 45 for outputting a reference signal, and the reference signal $S_{ref}$ using the anode voltage HV is output from the capacitor C20 for outputting a reference signal.

Desirably, the capacitor C20 for outputting a reference signal is formed so that its capacitance is equal to that of the capacitor C10 for outputting an index signal. By setting the capacitance of the signal-output capacitor C10 and that of the signal-output capacitor C20 to almost the same value, the amplitude, frequency characteristic, and the like of the reference signal $S_{ref}$ and those of an unnecessary signal component included in the index-detection signal $S_{ind}$ become very close to each other. As a result, in the signal-extracting circuit 50, removal of the unnecessary signal component included in the index-detection signal $S_{ind}$ is facilitated. The capacitance of the output capacitor C10 and that of the output capacitor C20 can be set to be almost the same by adjusting, for example, the size of the electrodes in the capacitors C10 and C20.

As described above, according to the embodiment, the structure of the capacitor C20 for outputting a reference signal and that of the capacitor C10 for outputting an index signal are set to be substantially the same. Consequently, as compared with the first embodiment, the capacitances can be made to coincide with each other more easily. Thus, the amplitude and the frequency characteristic of the reference signal Sref and those of the unnecessary signal component included in the index-detection signal $S_{ind}$ can be made easily to coincide with each other, and elimination of the unnecessary signal component included in the index-detection signal $S_{ind}$ is facilitated.

The invention also can be applied to a CRT having three or more electron-guns and forming a single picture-plane by connecting three or more scan picture planes. Although a single picture-plane is obtained by partially overlapping split-picture planes in the foregoing embodiments, a single picture-plane also can be obtained by simply, joining split-picture planes linearly without providing the overlap area. The invention is not limited to a cathode ray tube of an in-line electron-gun type but also can be applied to a common cathode ray tube having only one electron-gun.

As described above, in the cathode ray tube or the signal-detecting method in the cathode ray tube according to the invention, an unnecessary signal component included in an electric detection signal that is output in accordance with the incidence of an electron beam scanning an overscan area is eliminated on the basis of the reference signal, only a signal component necessary for image correction or the like can be extracted with high accuracy.

In the cathode ray tube according to the invention, the amplitude of a detection signal and that of a reference signal are matched with each other by amplitude-adjusting means. Consequently, a necessary signal component can be extracted with higher accuracy.

Obviously many modifications and variations of the present invention are possible in the light of the above teachings. It is therefore to be understood that within the scope of the appended claims the invention may be practiced otherwise than as specifically described.

What is claim is:

1. A cathode ray tube comprising:
   an envelope;
   an anode voltage portion to which an anode voltage is supplied;
   an electron-gun for emitting an electron beam for scanning a valid picture-plane area and an overscan area outside of the valid picture-plane area;
   first signal-output means for outputting an electric detection signal according to incidence of the electron beam for scanning the overscan area;
   second signal-output means connected to the anode voltage portion, for outputting a reference signal according to the anode voltage; and
   signal-extracting means to which the detection signal and the reference signal are input, for eliminating an unnecessary signal component included in the detection signal on the basis of the reference signal and extracting and outputting a necessary signal component.

2. A cathode ray tube according to claim 1, wherein the first output means comprises:
   electron beam detecting means provided for the overscan area in the envelope, for outputting an electric detection signal in accordance with incidence of the electron beam; and
   a first capacitor formed by using a part of the envelope and constructed to output a detection signal-output from the electron beam detecting means to the outside of the envelope, and
   the second signal-output means has a second capacitor formed by using a part of the envelope and constructed to output the reference signal to the outside of the envelope.

3. A cathode ray tube according to claim 2, wherein the envelope contains a dielectric element, the inner face of the envelope is covered with an inner conductive film to which the anode voltage is supplied,
   the anode voltage portion includes the inner conductive film, and
   the second capacitor includes:
      a dielectric portion formed by using a part of the dielectric element;
      the inner conductive film; and
      an external electrode disposed so as to face the inner conductive film via the dielectric portion.

4. A cathode ray tube according to claim 2, wherein the envelope contains a dielectric element, the inner face of the envelope is partially covered with the inner conductive film, and
   the second capacitor includes:
      a dielectric portion formed by using a part of the dielectric element;
      an internal electrode connected to the anode voltage portion and provided in an area which is not covered with the inner conductive film on the inner face of the envelope; and
      an external electrode disposed so as to face the internal electrode via the dielectric portion.

5. A cathode ray tube according to claim 1, further comprising amplitude-adjusting means for matching an amplitude of the detection signal and an amplitude of the reference signal with each other.

6. A cathode ray tube according to claim 1, comprising a plurality of electron-guns,
   wherein the valid picture-plane area and the overscan area are scanned with electron beams emitted from the plurality of electron-guns and an image is displayed by forming a single picture-plane by joining a plurality of split-picture planes formed by the scan so as to be partially overlapped.

7. A signal-detecting method in a cathode ray tube comprising an envelope, an anode voltage portion to which an anode voltage is supplied, and an electron-gun for emitting an electron beam for scanning a valid picture-plane area and an overscan area outside of the valid picture-plane area, comprising the steps of:
   outputting an electric detection signal in accordance with the incidence of the electron beam for scanning the overscan area;
   outputting a reference signal according to the anode voltage supplied to the anode voltage portion;
   eliminating an unnecessary signal component included in the detection signal on the basis of the reference signal; and
   extracting and outputting a necessary signal component.

* * * * *